United States Patent
Bornstein

(10) Patent No.: US 8,624,704 B2
(45) Date of Patent: Jan. 7, 2014

(54) SAFETY APPARATUS HAVING A CONFIGURABLE SAFETY CONTROLLER

(75) Inventor: Patrick Bornstein, Freiburg (DE)

(73) Assignee: Sick AG, Waldkirch (DE)

( * ) Notice: Subject to any disclaimer, the term of this patent is extended or adjusted under 35 U.S.C. 154(b) by 209 days.

(21) Appl. No.: 13/037,773

(22) Filed: Mar. 1, 2011

(65) Prior Publication Data

US 2011/0215896 A1 Sep. 8, 2011

(30) Foreign Application Priority Data

Mar. 3, 2010 (DE) .......................... 10 2010 010 014

(51) Int. Cl.
*G05B 19/02* (2006.01)
(52) U.S. Cl.
USPC ........ 340/4.3; 340/539.23; 340/531; 340/3.1; 340/573.1; 340/593; 340/540; 340/870.16; 700/2; 700/79
(58) Field of Classification Search
USPC ......................................................... 340/4.3
See application file for complete search history.

(56) References Cited

U.S. PATENT DOCUMENTS

| | | | |
|---|---|---|---|
| 2004/0019840 A1* | 1/2004 | Hashizume | .................... 714/724 |
| 2005/0010332 A1* | 1/2005 | Abe et al. | ...................... 700/245 |
| 2005/0203644 A1* | 9/2005 | Scalfani et al. | .................. 700/79 |
| 2006/0010230 A1* | 1/2006 | Karklins et al. | .............. 709/223 |
| 2008/0237511 A1* | 10/2008 | Heyden et al. | .................. 251/57 |
| 2009/0327942 A1* | 12/2009 | Eldridge et al. | ............. 715/771 |

FOREIGN PATENT DOCUMENTS

| EP | 1 936 457 A1 | 6/2008 |
|---|---|---|
| EP | 2 098 926 A1 | 9/2009 |

OTHER PUBLICATIONS

German Examination Report with citations, issued on Sep. 29, 2010, two (2) pages.

* cited by examiner

*Primary Examiner* — George Bugg
*Assistant Examiner* — Matthew Taylor
(74) *Attorney, Agent, or Firm* — Nath, Goldberg & Meyer; Jerald L. Meyer; Stanley N. Protigal

(57) ABSTRACT

A safety apparatus has a configurable safety controller (10) and a configuration means, wherein the safety controller (10) has at least one input (18) for the connection of a sensor (20*a-c*), at least one output (22) for the connection of an actuator (24*a-b*), and a control unit (14) configured to carry out a control program which generates a control signal at the outputs (22) in a dependence on input signals at the inputs (18) by means of logic rules. The logic rules are settable by means of the configuration means. A number code representing the logic rules can be generated in the configuration means, and the safety controller (10) includes an interface (30) for the input of the number code. The control unit (14) is configured to carry out a control program with the logic rules represented by the number code.

13 Claims, 2 Drawing Sheets

SAFETY APPARATUS HAVING A CONFIGURABLE SAFETY CONTROLLER

Figure 1A:
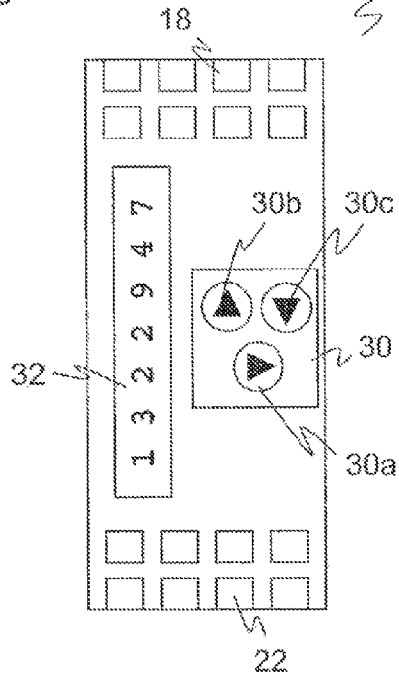

The invention relates to a safety controller having a configurable safety control, as well as methods for configuring a safety controller.

Safety controllers serve, amongst other things, to react in an error-free manner in a predefined way when a danger signal is present. A typical application of the safety technology is the protection of dangerous machines, such as presses or robots which have to be switched off immediately or have to be secured when operating personal approaches this in an unallowed manner. For this reason a sensor is provided, such as a light grid or a safety camera which recognizes the approach. Should such a sensor recognize a danger, then a safety control connected to the sensor has to generate a switch-off signal in an absolutely reliable manner.

In practice not only an individual sensor monitors an individual machine, but generally a whole series of danger sources have to be monitored. The corresponding plurality of associated sensors, which can respectively define a switching event, and suitable measures for the elimination of dangers must then be configured and switched in the safety controller.

This programming of the safety controller is supported by professional graphical user interfaces, which are typically delivered with the safety controller. The norm IEC 61131 for programming of control systems describes the graphical programming by means of functional components in IEC 61131-3, as well as an input/output interface description in physical technical values in IEC 61131-2. The configuration of the input switching and the output switching and their interfaces to sensors and to actuators are, however, not standardized.

The programming is a two-step process. Initially the requirements of the apparatus are specified by a control expert at a desk and are input and connected at the graphical user interface as logic blocks or similar functional blocks. In a second step the computer, preferably a laptop or a different portable device, on which the graphical user interface is implemented, is brought into the machine hall. The control program generated with the aid of the graphical user interface is transferred to the safety controller by means of a cable connected to the safety controller.

However, the control expert is frequently no longer available following the initial installation. If a safety controller now fails or has to be changed in its configuration, then the maintenance technician frequently does not have the knowledge of the control expert, nor does he have the computer having the graphical user interface at his disposal. The situation is even more difficult when, in the case of an OEM manufacturer, a plurality of like apparatuses are to be generated and a factory worker without in-depth technical training is entrusted with the configuration.

A common approach for the prevention of these disadvantages is the application of a rotary switch at the safety controller which can be operated by means of a screwdriver. Each rotary switch is associated with a certain control program. The service technician is taught which rotary position is to be selected for which control application by means of the accompanying documents or a flash program at the safety controller. This configuration is, however, neither particularly comfortable nor intuitive, as the only plausible connection between the rotary switch position and the control program is provided in the accompanying documents. Further-more, the rotary switch only allows a very small selection of different control programs.

For this reason the object of the invention is to provide a configuration possibility for safety controllers which require less expert knowledge and less constructional demands from an apparatus aspect.

This object is satisfied by a safety apparatus having a configurable safety controller and a configuration means, wherein the safety controller has at least one input for the connection of a sensor, at least one output for the connection of an actuator, as well as a control unit which is configured to carry out a control program which generates a control signal at the outputs in dependence on input signals at the inputs by means of logic rules, wherein the logic rules are settable by means of the configuration means, wherein in the configuration means a number code can be generated representing the logic rules and wherein the safety controller includes an interface for the input of the number code and wherein the control unit is configured to carry out a control program with the logic rules represented by the number code.

In a further aspect of the invention there is provided a method for configuring a safety controller which, by means of a control program, generates a control signal with reference to logic rules at at least one output for actuators in dependence on input signals of sensors at at least one input for sensors, wherein during the configuration the logic rules of the control program are set. The logic rules are set in that logic rules are initially selected in a configuration means and are transformed into a number code representing the logic rules, subsequently the number code is input into the safety controller via an interface and then a control program having the logic rules represented by the number code is carried out by the safety controller.

In this respect the invention starts from the basic idea that the result of a programming by means of a graphical user interface is to be combined into compact easily transferable information. In that a number code is automatically generated which represents the logic rules and thus finally the control program, the flexibility and the comfort of the graphical user interface is maintained and at the same time the actual programming of the safety controller is reduced to the input of this number code.

The invention has the advantage that the generation of the logic rules is decoupled from the configuration of the safety controller. Thus a control expert can generate the number code with the known support by means of graphical programming and thus effectively and flexibly generates the required program with, at the same time, the programming of the safety control itself no longer requiring a specific qualification. The control expert does not even have to come within the proximity of the safety control and can, for example provide the required number code also by means of telephone or by using different communication channels. Also the necessity of a connection between specific configuration software and the safety controller can be omitted.

The number code is preferably multi-digit and, in particular has at least 2 to 10 decimal points. Such a number code is still easily handable and at the same time allows a flexibility which is sufficient for many applications in the codeable logic rules. Although number codes with up to 20 or more decimal points are also plausible, the threshold is soon exceeded at which a number code can still be transferred and checked easily.

The interface is preferably configured for the connection of a mobile memory module. The number code can thereby be comfortably transferred without the input being a possible source of error.

The interface preferably has a key field for the counting up and counting down of a number code, in particular a button for the selection of the respective key to be set. The input principle in this respect is similar to the setting of times of a digital clock. Also multi-digit number codes can thereby be quickly and easily input with very few cost-effective manufacturable setting elements.

The safety controller preferably has a plurality of connection modules connected to a series each connection module having at least one input for the connection of a sensor and/or at least having one output for the connection of an actuator. By means of the connection modules a safety controller can be assembled which provides the required number of inputs and outputs in a simple manner.

Additionally even more preferably a head module is provided in which the control unit is stored. The control unit can alternatively be provided in one of the connection modules, alternatively the head module has inputs and outputs like a connection module.

Advantageously one of the connection modules has an interface for the input of a number code. Alternatively the interface is part of the head module. The number code is valid in most cases for a control program which is valid for all connection modules connected as a common safety controller. However, it is also plausible to provide a plurality of interfaces in several connection modules and to individually configure these for each of the parts of the control task in this way.

The configuration means is preferably configured to generate the number code with a checksum, wherein the safety controller is configured to check the checksum of a number code input at the interface. The term "checksum" in this respect should include any arbitrary coding which allows the verification of the integrity of any number code. In this manner an accidental error input of the number code is avoided at the interface. A very simple example is to provide the number code with an additional digit which includes the digit sum of the remaining digits.

The safety controller preferably has a display for number codes and the control unit is configured to carry out a control program, with the logic rules represented by a number code input at the interface only then when a confirmation of a displayed number code occurs. The number code is visually checked before the confirmation occurs, for example, by means of a certain time frame and series of a key operation. Also the input of a further specific number code for the authentication is plausible.

In the number code a first bit block is preferably provided which is a logic function, a second bit block is provided which represents a connection table of the logic block and a third bit block is also provided which codes the specific type of a logic block at an input. Logic functions can, for example be a simple AND link and/or a simple OR link. The connection table determines how the inputs, the logic functions and the outputs are connected to one another. Finally, in particular one channel or two channels as well as tested or non-tested inputs can be considered as a type of input. Through this coding the most important elements of the graphical programming are imaged in the number code.

The configuration means is preferably configured to determine logic rules by means of a graphical user interface by selection of logic blocks, inputs of logic blocks and connections between logic blocks. A graphical user interface simplifies the designing and checking of the logic rules in a considerable manner. The logic rules represented in a number code can vice versa be graphically illustrated. In this manner the code of a current configuration can be transformed back into a graphical program to modify the program or to have the program checked by means of a control expert.

The configuration means is preferably configured for a consistency test of the logic rules, in particular to test whether all inputs and outputs of logic blocks are connected. Consistency tests can prevent, at least in many cases, implausible or insecure control programs from arising. The inputs and outputs of a logic block mentioned here are not allowed to be confused with the inputs and the outputs of the safety controller.

The method in accordance with the invention can be furthered in a similar manner and in this respect has similar advantages. Such advantageous features are described in the claims dependent on the independent claims in an exemplary but not conclusive manner.

The two main steps of the method namely, the generation of a number code with the aid of a configuration means and the programming of the safety controller through the input of the number code can take place separate from one another both in space and time. For example, it is plausible that one or more configurations are designed by a control expert and transferred in the form of an operative command, an operation manual or during training. A service employee without in-depth technical knowledge can configure and/or program a safety controller at a different position and at a different time by inputting the number code.

Figure 1B:
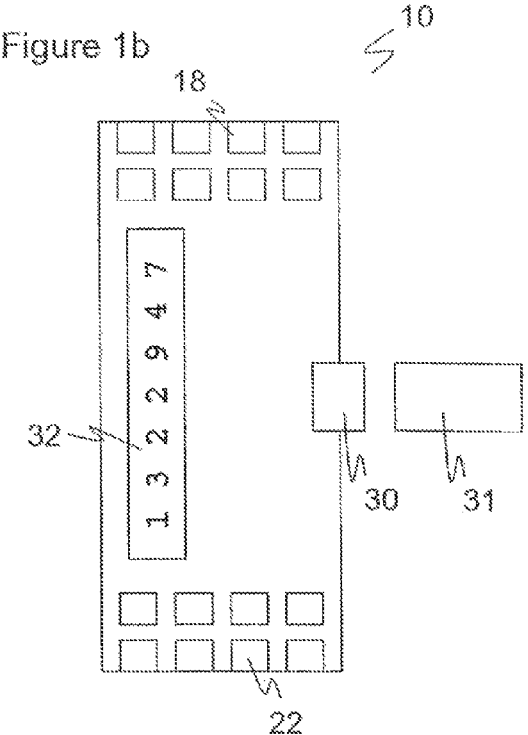
Figure 2:
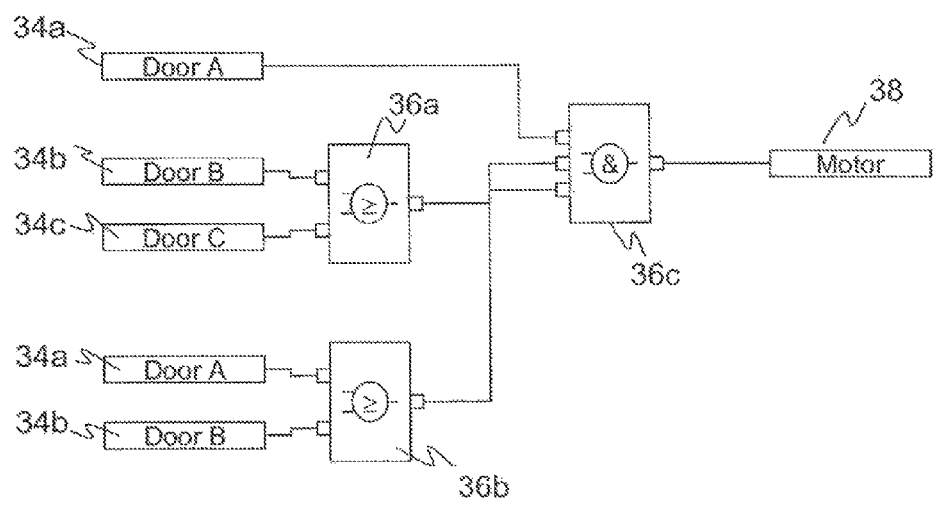

The invention will be described in the following also in view of further features and advantages in an exemplary manner with reference to embodiments and in accordance with the submitted drawing. The illustrations of the Figures show in FIG. 1a a schematic block illustration of a safety controller in accordance with the invention having an interface for the input of a number code;

FIG. 1b a schematic block illustration of a safety controller in accordance with the invention having an alternative interface for the input of a number code;

FIG. 2 exemplary logic rules in the view of a graphical user interface; and

Figure 3:
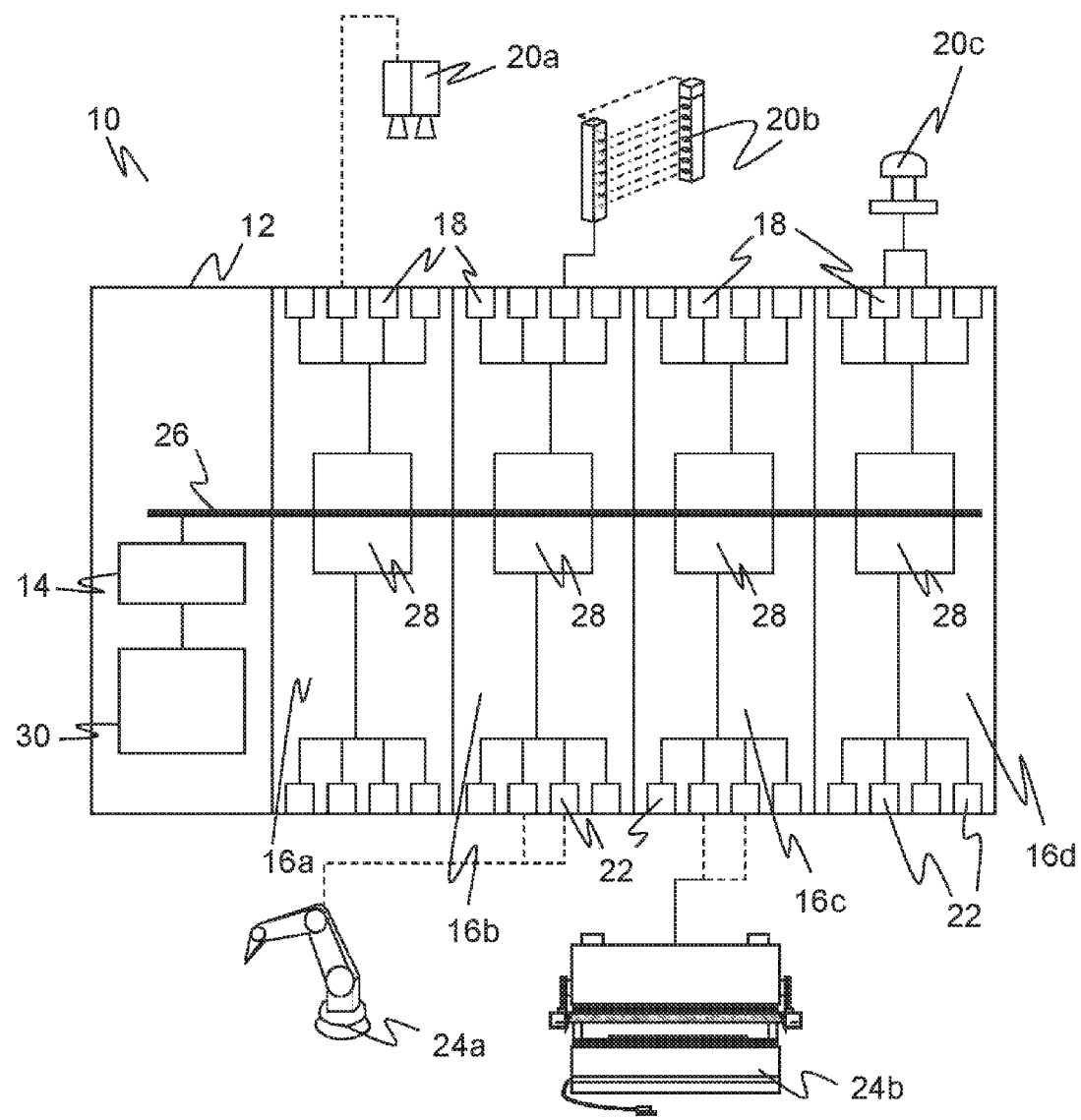

FIG. 3 a modular safety controller with an interface for the input of a number code.

FIG. 3 shows a modular safety controller 10 having a control module 12, which has a secure control unit 14, i.e. for example a microprocessor or a different logic component. Four connection modules 16a-d are sequentially connected to the control module 12. Inputs 18 for the connection of sensors 20a-c and outputs 22 for the connection of actuators 24a-b are provided in the connection module 16a-d. In contrast to the illustration the connection modules 16a-d can vary in their type and the number of their connections can be different and they can only have inputs, only have outputs as well as a mixture of different numbers of both. Also the arrangement and the physical realization of the connection clamps 18, 22 can be adapted and through the choice of a certain connection module 16 can be adapted to different plug types, cable sizes and signal types. Finally, the modules 12, 16a-d are illustrated in a simplified manner and can have further elements, for example each can have an LED for each connection in a clear arrangement which optically emphasizes the arrangement.

The safety controller has the task of ensuring a secure operation of the sensors 20a-c and, in particular the actuators 24a-b, i.e. to ensure that the actuators are switched off in a safety-related manner (the output 22 is then an OSSD, Output Switching Signal Device), to carry out an emergency stop of the plant in a reliable manner, to confirm an arbitrary control of an actuator 24a-b, especially a switching on or a restart of the plant, to release actuators 24a-b and such like.

A light grid 20b, a safety camera 20a, and a switch 20c are examples of safety relevant sensors or inputs which can deliver a signal, as a reaction to which a safety related switch off occurs. This can be an interruption of the light beams of the light grid 20b by a body part, the recognition of an unallowed interference into a safety region by the safety camera 20a or an actuation of the switch 20c. Further safety sensors of arbitrary kind, such as a laser scanner, 3D cameras, switching mats or capacitive sensors can be connected at the inputs 18, however, also different sensors, such as sensors for the reception of measurement data or simple switches such as an emergency stop switch can be connected. All such signal transmitters are described here and in the following as sensors.

For certain applications, sensors 20a-c are also connected to outputs 22 and actuators 24a-b are connected to inputs 18, for example to transmit a test signal, to temporarily switch a sensor 20a-c mute, to blank out partial regions from the monitoring zone of the sensor 20a-c or because an actuator 24a-b also includes, beside an input for controlling, signal outputs with which an actuator 24a-b can monitor itself at least partially.

A robot 24a and a press break 24b are connected to outputs 22 preferably in a two-channeled manner, which illustrate examples of dangerous actuators for operating personal on an unallowed interference. These actuators (in the form of a robot 24a and a press break 24b) can thus receive a switch-off command from the safety controller 10 to switch these actuators 24a-b off on recognition of a danger or an unallowed interference by the safety sensors 20a-c or to convey actuators 24a-b into a safe state on recognition of a danger or an unallowed interference by the safety sensors 20a-c. In this respect the light grid 20b can serve for the monitoring of the press break 24b and the safety camera 20a can serve for the monitoring of the robot 24a so that sensors 20a-b and actuators 24a-b associated with one another in a functional manner can also be respectively connected to a module 16a and/or 16b. However, the functional association occurs via the control unit 14 so that such an imaging of the plant is indeed clear, but is by no means required. Further actuators 24a-b than the ones illustrated are plausible and indeed also those are plausible which generate a danger region, and also others, such as a warning lamp, a siren or a display and such like.

A so-called serial communication connection 26 is provided as a backplane between the control unit 14 and the input 18 and/or the output 22 which backplane is, in particular a bus based on a serial standard, a field bus standard, such as an IO link, a profibus, a CAN bus or can also be based on a proprietary standard and additionally be configured as fail-safe. As an alternative to a bus also a direct connection, a parallel connection or any other type of connection 26 can be provided to correspondingly communicate the data amount and the required switching times. The modules 16a-d have their own control 28, to participate with the bus communication. For this reason a microprocessor, an FPGA, an ASIC, a programmable logic or a similar digital component can be provided. The controls 28 can also carry out evaluation tasks or commonly carry out different evaluations together with the control unit 14 which can range from the simplest Boolean linkings up to complex evaluations, such as a three-dimensional safety camera 20a.

The modules 12, 16a-d are each stored in a uniform housing and are connected mechanically and electrically to one another by connection pieces. Thereby the control module 12 forms the head of a module series.

Safety controller 14, inputs 18, outputs 22 and bus 26 are configured in a fail-safe manner, i.e. by measures such as a two channel adaptation, through diverse evaluations, redundant evaluations, self-check evaluations or other secure evaluations and self-tests. Corresponding safety requirements for the safety controller are specified in the norm EN 954-1 and/or ISO 13849 (performance level). The thereby possible safety level and the further safety requirements on an application are defined in the norm EN 61508 and/or EN 62061.

In accordance with the invention the actuator 24a-b is provided to carry out the configuration and programming of the safety controller 10 via an interface 30 by means of a number code as will now be explained in detail with reference to FIGS. 1 and 2.

FIG. 1a shows a simplified block illustration of a safety controller 10 which in this case is not configured modularly, or alternatively FIG. 1a can also be understood as an illustration of only one of the connection modules 16a-d. In this respect the same reference numerals refer to features having the same or similar function here and in the following.

The interface 30 has operating elements 30a-c to input a multi-digit number code which is illustrated at a display 32. The current digit to be input is selected by the input element 30a while one can count a selected digit up and/or down using the two other input elements 30b-c. To complete an input, whose correctness can be checked via the display 32, a specific combination of the operating elements 30a-c is actuated. This combination is only known from training or from the handbook and thus ensures at least a certain protection with respect to unwanted and non-authorized changes or inputs.

In an alternative embodiment, shown in FIG. 1b, the interface 30 is designed for the reception of a mobile memory module 31, for example as a USB interface, as an SD card slot or such like. If a matching memory module 30 is inserted with a number code, then the number code is automatically transferred to the safety controller 10 and illustrated at the display 32. Similar to the other embodiments the user confirms whether this is the desired number code and confirms the number code by actuating the specific combination of the operating elements 30a-c.

The number code corresponds to logic rules and thus specifies a control program which is activated for the further operation through the input of the number code in the safety controller 10.

The generation of a number code representing a control program will now be explained with reference to the graphic illustration of an exemplary graphic illustration of logic rules in FIG. 2. Such an illustration is the result of a graphical programming using a configurator, which is implemented for example on a PC, a notebook, a PDA or a mobile phone.

Three inputs 34a-c are provided in the example and are referred to as "door A" to "door C". These are connected to one another via the logic blocks 36a-c and are thus calculated to an output 38.

Simple AND gates and/or OR gates are the plurality of the logic blocks 36a-c required in the safety technical application. More complex logic blocks, such as muting or bypass are less frequent. The invention initially aims to provide simpler logic blocks 36a-c as these can be coded in a very short number code and still allow even more flexibility than, for example a common rotary switch. Principally, however, also complex logic blocks are plausible.

The user selects the required inputs 34a-c and determines their type, i.e. whether they are one-channeled or two-channeled and whether they are tested or not, in the graphic programming. The inputs 34a-c are linked to one another via suitable logic blocks 36a-c. The user thereby obtains a large flexibility in the generated control program.

When the user wants to conclude the graphical programming, a compiling function is initiated which transforms the inputs 34a-c, the logic blocks 36a-c and their connections into a multi-digit number code. Prior to the compilation also plausibility test of the graphic program is still plausible in which, for example, the user is alerted when inputs or outputs of logic blocks 36a-c are not used.

In an exemplary coding 3 bits are respectively provided for the type of a logic block 36a-c, so that eight different logic blocks 36a-c can be selected.

If n logic blocks 36a-c are provided then they correspondingly use 3n bit. For simplification each logic block 36a-c has exactly two inputs and an output in the internal representation. This restriction can be hidden from the user in that, for example, on compiling an AND block with three inputs 34a-c is replaced by means of a suitable serial linking of two AND blocks each having two inputs 34a-c. Further bits are required to specify the connections between the logic blocks. For example, a number series is generated whose i-th number denotes the target of the output of the i-th logic block 36a-c. The four mentioned possible input types finally require that each logic block 36a-c has two inputs 34a-c, 2*4 possibilities or each have 3 bits, i.e. a total of 3n bit.

Thus in a 24 bit number code which has seven decimal points three logic blocks 36a-c can be coded. Naturally also other coding schemes and different code lengths are possible for an arbitrary type of graphical programming of logic rules. The number code can be provided with a safe guard, for example a checksum to avoid input errors.

The thereby calculated number code is displayed or stored in a mobile memory module 31 and transferred at a later point in time to the safety controller 10 via the interface 30 which then uses the associated control program. Following a configuration in the safety technology a functional test is typically carried out in which the sensors 20a-c are specifically tested with examining bodies with respect to their correct cut-off behavior.

The invention claimed is:

1. A safety apparatus having a configurable safety controller (10) and a configuration means, wherein the safety controller (10) has at least one input (18) for the connection of a sensor (20a-c), at least one output (22) for the connection of an actuator (24a-b), as well as a control unit (14) which is configured to carry out a control program which generates a control signal at the outputs (22) in dependence on input signals at the inputs (18) by means of logic rules, wherein the logic rules are settable by means of the configuration means, wherein in the configuration means a number code can be generated representing the logic rules and wherein the safety controller (10) includes an interface (30) for the input of the number code and wherein the control unit (14) is configured to carry out a control program with the logic rules represented by the number code, wherein the configuration of the control unit permits the generation of a number code and programming of the safety controller through the input of the number code to take place separate from one another both in space and time, and wherein first bit blocks are provided in the number code with a logic block (36) and other bit blocks are provided in the number code having a connection table for a logic block (36).

2. A safety apparatus in accordance with claim 1, wherein the interface (30) is configured for the connection of a mobile memory module (31).

3. A safety apparatus in accordance with claim 1, wherein the interface (30) includes a key field (30a-c) for the counting up and counting down of a number code.

4. A safety apparatus in accordance with claim 3, wherein the interface (30) has a button (30c) for the selection of a respective number to be set.

5. A safety apparatus in accordance with claim 1, wherein the safety controller (10) includes a plurality of connection modules (16a-d) connected to a row, each having at least one input (18) for the connection to one of said sensors (20a-c) and/or each having at least one output (22) for the connection to one of said actuators (24a-b).

6. A safety apparatus in accordance with claim 1, wherein the configuration means is configured to generate the number code with a checksum and wherein the safety apparatus (10) is configured to check the checksum of a number code input at the interface (30).

7. A safety apparatus in accordance with claim 1, wherein the safety controller (10) has a display (32) for number codes and the control unit (14) is configured to only then carry out a control program with logic rules representing a number code input at the interface (30) when a confirmation of a displayed number code occurs.

8. A safety apparatus having a configurable safety controller (10) and a configuration means, wherein the safety controller (10) has at least one input (18) for the connection of a sensor (20a-c), at least one output (22) for the connection of an actuator (24a-b), as well as a control unit (14) which is configured to carry out a control program which generates a control signal at the outputs (22) in dependence on input signals at the inputs (18) by means of logic rules, wherein the logic rules are settable by means of the configuration means, wherein in the configuration means a number code can be generated representing the logic rules and wherein the safety controller (10) includes an interface (30) for the input of the number code and wherein the control unit (14) is configured to carry out a control program with the logic rules represented by the number code, wherein first bit blocks are provided in the number code with a logic block (36), second bit blocks are provided in the number code having a connection table for a logic block (36), and third bit blocks are also provided in the number code which code the type of input (38) of a logic block (36).

9. A safety apparatus in accordance with claim 1, wherein the configuration means is configured to determine logic rules by means of a graphical user interface by selection of logic blocks (36), inputs (34) of logic blocks (36) and connections between logic blocks (36), and to graphically illustrate the logic rule represented by a number code.

10. A safety apparatus in accordance with claim 1, wherein the configuration means is configured for a consistency examination of the logic rules.

11. A safety apparatus in accordance with claim 10, wherein the configuration means is configured to test whether all inputs and outputs of logic blocks (36) are connected.

12. A method for configuring a safety controller (10) which, by means of a control program, generates a control signal with reference to logic rules at at least one output (22) for actuators (24a-b) in dependence on input signals of sensors (20a-c) at at least one input (22) for sensors (20a-c), wherein during the configuration the logic rules of the control program are set, wherein the logic rules are set in that logic rules are initially selected in a configuration means and are transformed into a number code representing the logic rules, subsequently the number code is input into the safety controller (10) via an interface (30) and then a control program having the logic rules represented by the number code is carried out by the safety controller (10) wherein the configuration of the control unit permits the generation of a number code and programming of the safety controller through the input of the number code to take place separate from one another both in space and time, and wherein first bit blocks are provided in the number code with a logic block (36) and other bit blocks are provided in the number code having a connection table for a logic block (36).

13. A safety apparatus in accordance with claim 1, wherein the configuration means is configured to determine logic rules by means of a graphical user interface by selection of logic blocks (36), inputs (34) of logic blocks (36) and connections between logic blocks (36), or to graphically illustrate the logic rule represented by a number code.

* * * * *